US006510890B1

(12) United States Patent
Paskach et al.

(10) Patent No.: US 6,510,890 B1
(45) Date of Patent: Jan. 28, 2003

(54) CONTINUOUS SYSTEM AND METHOD FOR PRODUCING FROZEN FOOD PRODUCTS

(75) Inventors: Thomas J. Paskach, Ames, IA (US); William D. Schroeder, Ames, IA (US)

(73) Assignee: Iowa State University Research Foundation, Inc., Ames, ID (US)

( * ) Notice: Subject to any disclaimer, the term of this patent is extended or adjusted under 35 U.S.C. 154(b) by 258 days.

(21) Appl. No.: 09/703,535

(22) Filed: Nov. 1, 2000

Related U.S. Application Data

(60) Provisional application No. 60/197,046, filed on Apr. 14, 2000.

(51) Int. Cl.[7] .................................................. F25D 17/04
(52) U.S. Cl. ................................ 165/61; 62/376; 62/64; 426/524
(58) Field of Search ........................... 62/64, 373, 376; 165/61, 63, 64; 426/524

(56) References Cited

U.S. PATENT DOCUMENTS

| | | | | |
|---|---|---|---|---|
| 2,951,351 A | * | 9/1960 | Snelling ........................ | 62/158 |
| 3,102,865 A | * | 9/1963 | Sneary et al. ................. | 159/47.1 |
| 3,910,812 A | * | 10/1975 | Kaneko et al. ................ | 159/3 |
| 4,060,391 A | * | 11/1977 | van Heel et al. ............. | 165/101 |
| 4,089,367 A | * | 5/1978 | Wietzel et al. ................ | 165/101 |
| 4,704,873 A | * | 11/1987 | Imaike et al. ................. | 62/538 |
| 4,993,238 A | | 2/1991 | Inagaki .......................... | 62/306 |
| 5,098,732 A | | 3/1992 | Inagaki .......................... | 426/565 |
| 5,126,156 A | | 6/1992 | Jones ............................. | 426/418 |
| 5,223,542 A | * | 6/1993 | Byers et al. ................... | 424/DIG. 10 |
| 5,307,640 A | * | 5/1994 | Fawzy et al. .................. | 62/373 |
| 5,475,984 A | * | 12/1995 | Fermani et al. ............... | 62/373 |
| 5,664,422 A | | 9/1997 | Jones ............................. | 62/64 |
| 6,000,229 A | * | 12/1999 | Jones et al. ................... | 62/373 |

* cited by examiner

Primary Examiner—William E. Tapolcai
(74) Attorney, Agent, or Firm—Schwegman, Lundberg, Woessner & Kluth, P.A.

(57) ABSTRACT

An apparatus for making a frozen food product comprising a mixer having no moving parts is disclosed. The apparatus further comprises heating means external to the mixer. The premix and refrigerant combine inside the mixer to produce a frozen food product. The heating of the mixer raises the temperature of the mixer sufficiently to prevent crystallization of the mixer contents at the mixer wall, thus preventing "over-freezing." In this way, plugging of the mixer is minimized and the end product exits the mixer unassisted by mechanical means, yet is still in a frozen state. Thus, it is now possible to produce a quality frozen food product using cryogenic refrigerants, without causing the end product to be at cryogenic temperatures. The present invention has the further advantage of allowing adjustable quantities of refrigerant and premix to be used. The invention is simple in operation and can be operated in a portable and/or continuous manner. The resulting products can be made as a soft or hard frozen food product by adjusting various parameters, including, but not limited to, flow rates, jacket, temperatures, tube length, and so forth.

21 Claims, 7 Drawing Sheets

CONTINUOUS SYSTEM AND METHOD FOR PRODUCING FROZEN FOOD PRODUCTS

This application claims the benefit under 35 U.S.C. 119 (e) of U.S. Provisional Application Ser. No. 60/197,046, filed on Apr. 14, 2000, hereby incorporated by reference in its entirety.

FIELD

This invention relates generally to systems and methods for producing food products and, in particular, the present invention relates to a continuous system and method for producing frozen food products.

BACKGROUND

Frozen food products, such as frozen yogurts, ice cream, and so forth are popular snack foods. Non-dairy frozen products, such as soy and rice-containing products, sorbets, and so forth, are also well-known. A variety of devices are used to produce frozen food products either continuously or in batches. Many of these devices use ammonia as a refrigerant. The ammonia is typically applied in a jacket surrounding a mixer.

Some commercial devices use cryogenic refrigerants, such as liquid nitrogen. A cryogenic refrigerant is typically contacted directly with the food product in a chamber having mechanical mixing means. However, a cryogenic refrigerant can be difficult to use because it so readily freezes a food product "rock" hard due to its extremely cold temperature, e.g., liquid nitrogen has a boiling point of about −196° C. at atmospheric pressure. Such "over-freezing" can prevent the mechanical mixing means from properly functioning. Furthermore, mechanical mixing means are often complex in nature and subject to wear and/or breakage.

U.S. Pat. Nos. 5,126,156 and 5,664,422 to, Jones, describe a device that uses liquid nitrogen for preparing and storing a free-flowing frozen dairy product. In Jones, the product exiting the mixing chamber has been frozen into small beads. The beads must be kept sufficiently cold to retain their free-flowing character so they can be removed from the mixing chamber with an auger to another container. The beads must then be warmed before consumption. This process is complex in both design and operation, and further requires a separate step to warm the end product prior to consumption.

Thus, what is needed is a device and method for producing a tasteful frozen food product that is simple in design and operation, yet is capable of operating in a portable and continuous manner.

SUMMARY

An apparatus for making a frozen food product comprising a mixer having no moving parts is disclosed. The apparatus further comprises heating means external to the mixer. The premix and refrigerant combine inside the mixer to produce a frozen food product. The heating of the mixer raises the temperature of the mixer sufficiently to prevent crystallization of the mixer contents at the mixer wall, thus preventing "over-freezing." In this way, plugging of the mixer is minimized and the end product exits the mixer unassisted by mechanical means, yet is still in a frozen state. Thus, it is now possible to produce a quality frozen food product using cryogenic refrigerants, without causing the end product to be at cryogenic temperatures.

The present invention has the further advantage of allowing adjustable quantities of refrigerant and premix to be used. The invention is simple in operation and is preferably operated in a portable and/or continuous manner, although the invention is not so limited. The resulting products can be made as a soft or hard frozen food product by adjusting various parameters, including, but not limited to, flow rates, jacket, temperatures, tube length, and so forth.

These and other features, aspects, and advantages of the present invention will become better understood with regard to the following description, appended claims and accompanying drawings.

DETAILED DESCRIPTION

Figure 1:
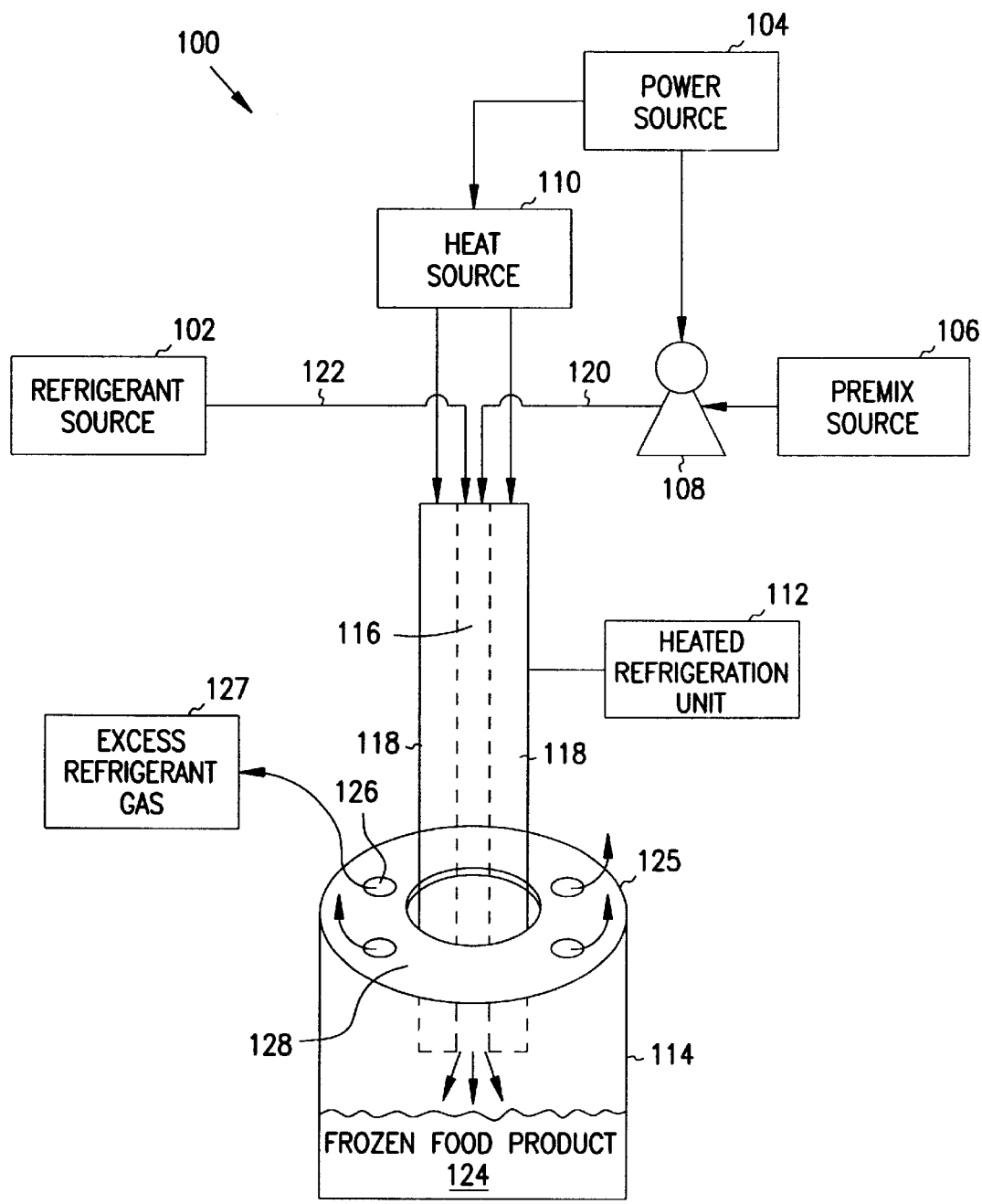
FIG. 1 is a simplified schematic illustration of a system for producing a frozen food product in one embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents.

Numbering in the Figures is usually done with the hundreds and thousands digits corresponding to the figure number, with the exception that the same components may appear in multiple figures.

As used herein, the terminology top, bottom, end and sides are referenced according to the views presented. It should be understood, however, that the terms are used only for purposes of description, and are not intended to be used as limitations. Accordingly, orientation of an object may change without departing from the scope of the invention.

Introductory Definitions

As used herein, the term "additive" is intended to encompass any type of food ingredient added to a food product at any time during the process. A "topping" is one type of additive which typically stays on "top" of the end product, although a "topping" can also be applied as a "coating" such that it adheres to some or all of the end product, with or without the assistance of a carrier substance. Liquids in any form are also considered to be additives as are colors or coloring agents (defined below). Additives also include nutrient and health additives such as vitamins, minerals, encapsulated biologically active components, nutraceuticals (defined below), dietary supplements, anti-oxidants, fibers, inulin, calcium carbonate, probiotic bacteria sprinkles (e.g., lactobacillus or acidophilus), energy additives, protein powders, powdered milk fractions, protein or satiety additives, herbs, aromatic substances, and other similar health-enhancing additives. Additives also include emulsifiers and thickeners, such as carrageenan, guar gum, lecithin, egg whites or yolks, starches (corn, tapioca, arrow root, etc.). Additives also include sugars of all types as defined herein.

The term "color" or "coloring agent" as used herein refers to natural or uncertified colors from natural sources or certified colors for the effect of color. In one embodiment, the colors include dyes, certified aluminum lakes or colors derived from a natural source. Coloring agents may be water-based, oil-based or dry. Coloring agents may be primary colors, blends of colors or discrete mixtures of colors, such as confetti.

The term "fat" as used herein refers to any animal or vegetable fat (in solid or liquid form) or fat substitute.

The term "flavor" or "flavoring" as used herein refers to an organoleptic agent in the form of an emulsion, concentrate, aqueous- or oil-soluble liquid or dry powder, as well as any type of chunky pieces that may be added to a mixture at any time in the process. Flavorings can also be considered additives and can include nuts, nut pieces, fresh fruits, dried fruits, fruit products, candies, marshmallows, chocolates and chocolate products, and so forth. Flavorings further include any fruit flavors such as berry flavors, apple, cherry, plum, raisin, banana, pear, peach, figs, dates and so on. Flavorings may also include fats, salts, honeys, cheeses, frosting, powdered food products, sugar, sugar substitutes, gelatins and spices. Flavorings may also include colorings as well as any nut flavors as well as any sweet flavors such as chocolate, vanilla, caramel, butterscotch, lemon, malt, cinnamon, graham, coconut flavors, mint and so on. Flavorings additionally include any savory flavors such as all meat, game, fowl, fish, dairy, barbecue, smoke, pepper, spicy and vegetable flavors.

The term "frozen" as used herein refers to a substance being in a solid state, as opposed to a liquid or vapor phase. A frozen substance is considered to be "very" cold in temperature, i.e., at or below a "freezing" temperature. However, a "frozen" substance is not necessarily frozen hard or firm, but can also be a "soft" substance which changes its shape when pressed. The term "frozen" as used herein is also intended to encompass the term "partially frozen." A partially frozen substance is a substance that has been frozen to some extent, but not completely. A "partially frozen" substance is also technically a solid, but may be "soft" enough to be considered a highly viscous liquid, such that it can flow when pressure is applied and can be pressed to take the shape of the container it is in. A partially frozen substance is also very cold, but can have a range of temperatures throughout, such that one or more portions of the substances are above a freezing temperature. A "chilled" substance is a substance that has been made colder as compared to its starting temperature, but is not frozen.

The term "nutraceutical" as used herein refers to edible materials having, or believed to have, medicinal effects. Nutraceuticals include the tocopherols, B vitamins, ginseng, wheat grass and barley grass and extracts of the grasses, soy-based estrogen analogs, minerals and so on.

The term "premix" as used herein refers to a liquid or dry composition that can be processed to produce a final product that may be frozen, partially frozen or chilled. Liquid compositions can include, but are not limited to, milk, cream, ice milk, water, juices, carbonated beverages, and other flavored liquids. A premix can contain additives, flavorings, and so forth. A premix can be a dairy product or a non-dairy product, such as a grain-based product (e.g., rice, soy, and so forth). A dry or powdered premix is combined with a suitable fluid prior to processing.

The term "refrigerant" as used herein preferably refers to a "cryogenic refrigerant." This includes, but is not limited to, carbon dioxide, liquid nitrogen, liquid air, liquid argon, liquid helium, liquid oxygen, and so forth, further including any combination of the above. However, the term "refrigerant" can also refer to any known means of providing adequate refrigeration other than a cryogenic refrigerant.

The term "sugar" as used herein refers to substantially all sugars and sugar substitutes, including any monosaccharide such as glucose or fructose, disaccharides such as lactose, dextrose, sucrose or maltose, polysaccharides such as starch, oligosaccharide, sugar alcohols, or other carbohydrate forms such as gums that are starch based, vegetable based or seaweed based.

Description of the Embodiments

FIG. 1 shows one embodiment of a frozen food product system 100 of the present invention comprising a refrigerant source 102, power source 104, liquid composition (premix) source 106, premix pump 108, heat source 110, heated refrigeration unit 112 and frozen food product container 114. The heated refrigeration unit 112 comprises a mixer 116 and an external jacket 118. The power source 104 provides power to the premix pump 108 and can also be used to supply power to the heat source 110. The premix is pumped using a suitably-sized pump 108 from the premix source 106 to the mixer 116 in line 120. Refrigerant flows under pressure from the refrigerant source 102 to the mixer 116 in line 122. The premix and refrigerant combine naturally, i.e., without the assistance of mechanical mixing means, inside the mixer 116 to form a frozen food product 124 that exits into the frozen food product container 114. In the embodiment shown in FIG. 1, the frozen food product container 114 further comprises a lid 125 having vent holes 126 through which excess refrigerant gas 127 can be vented. The lid 125 further comprises a seal or gasket 128 into which the heated refrigeration unit 112 is inserted. In an alternative embodiment, there is no lid 125 and the frozen food product 124 is deposited directly into any suitably-sized open container in the same manner. In another alternative embodiment, the container is under pressure or vacuum. By maintaining the container under pressure, it may be possible to better control the amount of refrigerant gas in the final product, i.e., the amount of "overrun" in the frozen food product 124.

The power source 104 can be any suitable source of energy such as propane gas, a small generator, a solar energy system, a geothermal energy system, fuel cells, a photovoltaic system, one or more batteries of any type, or a normal power grid system. Suitable connections known in the art, such as power cords, and so forth can be used to provide power to desired components in the system.

Any conventional food grade pump can be used as the pump 108 including, but not limited to, a peristaltic pump, centrifugal pump, piston, pump, slurry pump, and so forth. A slurry pump may be particularly advantageous in embodiments in which added pieces, such as chunky pieces, are combined with the premix. In one embodiment, a slurry pump having a rubber impeller (or rubber lobes) is used. In another embodiment, the premix is contained in a pressurized vessel and is added to the mixer under pressure directly from the vessel, without the use of a pump.

It will be understood by those skilled in the art that all of the lines in the frozen food producing system are made from materials which can be either flexible or rigid, depending on their location and use. Furthermore, all lines are of a suitable diameter for their intended purpose, but are preferably between about 0.65 cm (0.25 in) and about ten (10) cm (four [4] in). in diameter. It will also be appreciated by those skilled in the art that flexible lines can include hoses made from rubber, plastic or other suitable material, and rigid lines can be made from galvanized metal, stainless steel, copper, stainless steel, poly vinyl chloride (PVC) or other suitable material. Any of the lines can also be insulated as needed. For example, any conventional food grade tubing can be used for line 120, such as neoprene tubing. Conventional refrigerant tubing can be used for line 122. In one embodiment copper tubing is used. In another embodiment, a flexible stainless steel line made specifically for liquid nitrogen transfer is used. In one embodiment, line 122 is insulated to minimize refrigerant losses. In a particular embodiment, poly isobutylene insulation is used. In another embodiment, fiberglass insulation, which is less prone to freezing and cracking, is used.

The heated refrigeration unit 112 comprises a mixer 116 and a jacket 118 surrounding the mixer 116. The mixer 116 can be made from any material known in the art that can conduct heat, such as stainless steel or copper, although the invention is not so limited. In one embodiment, both the mixer 116 and the jacket 118 are made from the same material, although the invention is not so limited. The mixer 116 can be any suitable size and shape that allows the premix and refrigerant to combine naturally, i.e., as a result of the turbulence created by the premix and refrigerant contacting each other, rather than with mechanical mixing means, such as paddles, augers, scrapers, and so forth. Tests to date do not indicate that there is an optimum length to diameter ratio, although further testing may provide such information.

Generally, a longer mixer 116 increases contact time between the refrigerant and premix, resulting in less unused refrigerant. Increased contact time typically results in an improved product due to the more "intimate" mixing of the components (i.e., more "even" cooling of the refrigerant throughout the end product) that can occur with additional time. Such intimate mixing is known to produce a more consistent product. A consistent product does not have areas or pockets of varying texture and hardness, i.e., areas of "super-cooled" product that are "rock" hard due to the presence of excess refrigerant locally and corresponding areas of insufficiently cooled product due to the absence of an adequate amount of refrigerant. However, if the mixer 116 is too long in relation to a given amount of refrigerant provided, the end product would likely become too cold, i.e., the premix and/or end product would begin to collect as a solid on the mixer walls, and the mixer 116 would plug with solid material, likely almost instantly.

In one embodiment, the mixer 116 is a portable unit about 38 to 76 cm (about 15 to 30 in) in length and about 0.8 to five (5) cm (about 0.3 to two (2) in) in diameter. In a particular embodiment, the mixer 116 is about 46 to 51 cm (about 18 to 20 in) in length and about 1.27 cm (about 0.5 in) diameter. In another particular embodiment, the mixer 116 is about 69 cm (about 27 in) in length and about 1.27 cm in diameter. In another embodiment, the mixer 116 is a commercial unit that is up to ten (10) meters or more in length, and about 0.1 to 0.5 meters or more in diameter.

The mixer 116 can be oriented in any direction during operation as long as the ingredients can adequately combine as noted above. In one embodiment, the mixer 116 is substantially vertical during operation. In another embodiment, the mixer 116 is substantially horizontal. In other embodiments, the mixer 116 is placed at any desired angle that provides maximum mixing efficiency. Again, proper positioning of the mixer 116 for optimum results can be determined with further testing and will likely vary depending on the particular application.

The external jacket 118 surrounding the mixer 116 provides heat to the mixer 116 so that the temperature is increased sufficiently at the inner surface of the wall of the mixer 116 to minimize or eliminate plugging of the mixer 116 as noted above. In this way, the frozen food product 124 can exit the mixer 116 unassisted, yet is still in a frozen state. This is unlike conventional devices, in which mechanical mixing means, such as scrapers for scraping solid mixer contents from the inner surface of the wall of the mixer, are required. The external jacket 118 can use any heating means known in the art that can distribute heat relatively evenly. In one embodiment, the external jacket 118 is a heat exchanger comprised of one or more shells through which a fluid flows. In another embodiment, the jacket 118 is self-heating, such that there is no need for a separate external heat source 110, although the jacket 118 may need to be directly connected to an external power source. For example, in one self-heating embodiment, the jacket 118 is any type of heating wire or wires, and can be enclosed in a heated wrap, similar to a heating pad. In yet another embodiment, the external jacket 118 is integral with the mixer 116 itself.

The heat source 110 can be any type of means having adequate heat capacity and capable of providing heat to the external jacket 118. In the embodiment where the external jacket 118 is essentially a heat exchanger, the heat source 110 can be provided by a fluid heater and recirculator unit. Any suitable heat transfer fluid can be used, including but not limited to, an oil-containing fluid, water, any type of antifreeze, e.g., ethylene glycol, and so forth. However, for products in which a low temperature is desirable, however, such as about −20° C. or below, water may be subject to freezing inside the heated refrigeration unit 112. In these applications, use of an oil-based or antifreeze composition as the heat transfer fluid may provide improved results.

Figure 2:
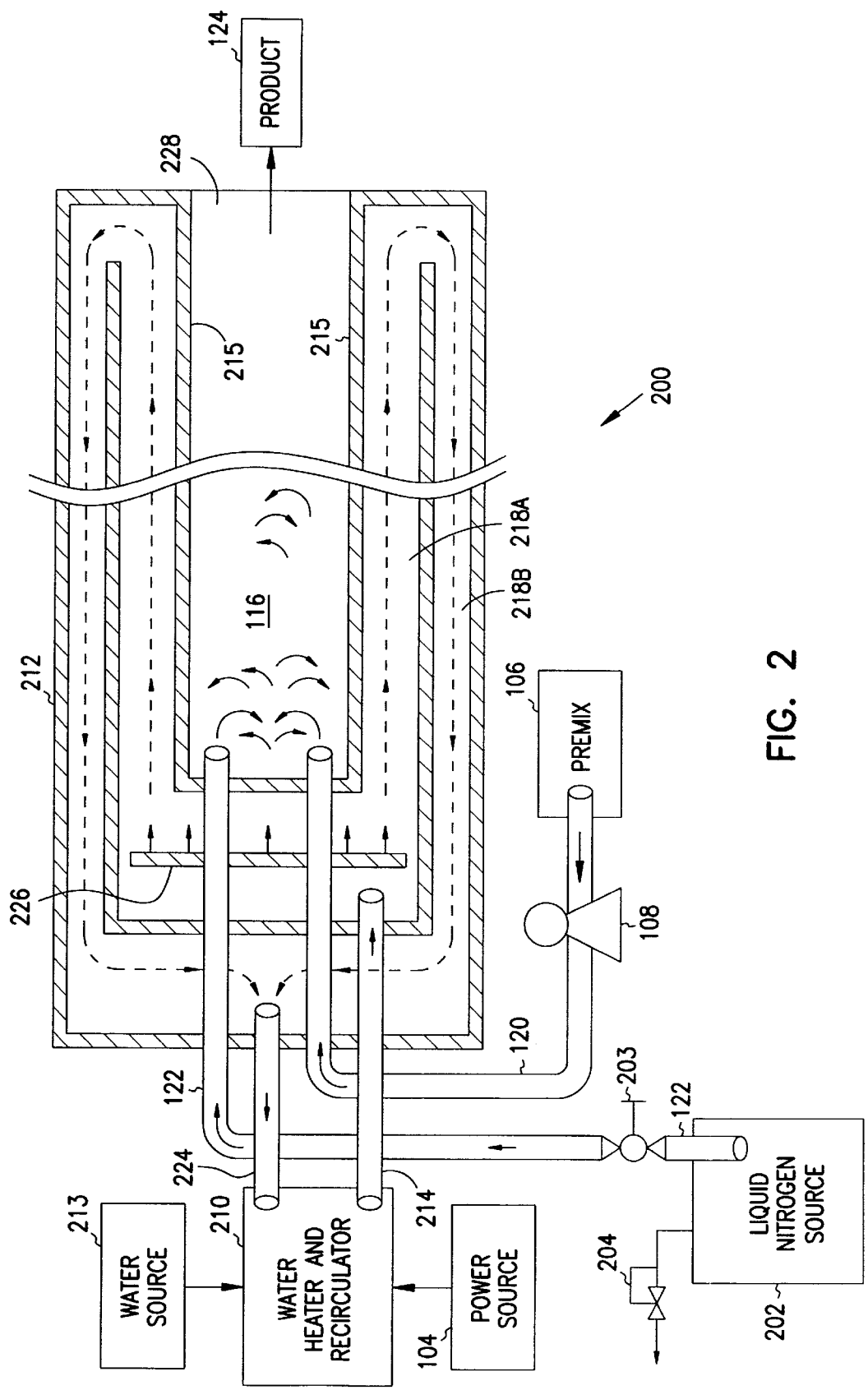
FIG. 2 is a simplified schematic illustration of a system for producing a frozen product that includes a simplified longitudinal cross-section of a water-heated refrigeration unit in one embodiment of the present invention.

FIG. 2 shows one embodiment of a water-heated frozen food product system 200 that uses a water heater and recirculator unit "recirculator") 210. In this embodiment, the refrigeration unit is a water-heated refrigeration unit 212. As FIG. 2 shows, the mixer 116 has a wall 215 of a suitable thickness as described below. The refrigerant source is liquid nitrogen 202 that is released with a refrigerant valve 203 located in line 122. The liquid nitrogen source 202 also has a pressure relief valve 204 that is used to control pressure by releasing excess nitrogen. The liquid nitrogen and premix combine naturally in the mixer 116 to form the frozen food product 124, which flows out an opening 228 in the end of the mixer 116. Water for the recirculator 210 can be provided initially from any conventional water source 213. The recirculator 210 draws power from the power source 104 to heat the fluid to the desired temperature and to recirculate the fluid. In this way, the external jacket 118 is essentially functioning as a "shell and tube" heat exchanger with heated water entering the water-heated refrigeration unit 212 through line 214, flowing external to and along the length of the mixer 116 in an inner shell or "tube" 218A, which surrounds the mixer 116. Cooled water exits the inner shell 218A at the opposite end of the mixer 116 and flows into an outer shell or "shell" 218B, which surrounds the inner shell 218A. The cooled water in the outer shell 218B flows in a direction opposite to the heated water. The cooled water exits the water-heated refrigeration unit 212 through line 224 and returns to the water heater and recirculator unit 210 to be reheated and recirculated.

In another embodiment, heated water flows in the outer shell 218B and cooled water flows in the inner shell 218A. The precise location of the warmest-available fluid is not important, as long as the fluid flowing next to the mixer 116 provides sufficient heat along the length of the wall 215 to minimize or eliminate crystallization of the mixer contents at the wall 215, i.e., keep most or all of the mixer contents in a liquid state at the wall 215. Otherwise, the existence of one or more solid crystals at the wall 215 function as a plugging accelerant. In other words, such crystals can attract other crystals that comprise the mixer contents flowing in the mixer 116 away from the wall 215, leading to solid build-up of premix and/or end product on the wall 215, and eventually, a plugged mixer 116. In an alternative embodiment, suitable devices and controls are in place to detect crystal build-up on the wall 215, so as to provide added heat to those particular areas of the wall 215.

The wall 215 can be any suitable thickness and texture, as long as it is maintained at a temperature sufficient to keep the contents of the mixer in a liquid state at the inner surface of the wall 215, throughout the length of the mixer 116. In one embodiment, the wall 215 is less than about 0.16 cm (0.0625 in) thick. In another embodiment, the wall 215 is more than about 0.16 cm thick. In the embodiment shown in FIG. 2, the wall 215 has a relatively smooth surface, both on its inner and outer surfaces. In an alternative embodiment, the inner surface of the wall 215 is textured. In another embodiment, the inner surface of the wall 215 has baffles or ribs attached essentially forming a static mixer. Large-scale embodiments, in particular, may require additional structure inside the mixer 116 to aid in developing adequate turbulence of the contents inside. In such an embodiment, additional heat may also be necessary to prevent sticking or plugging of the mixer contents.

Figure 3:
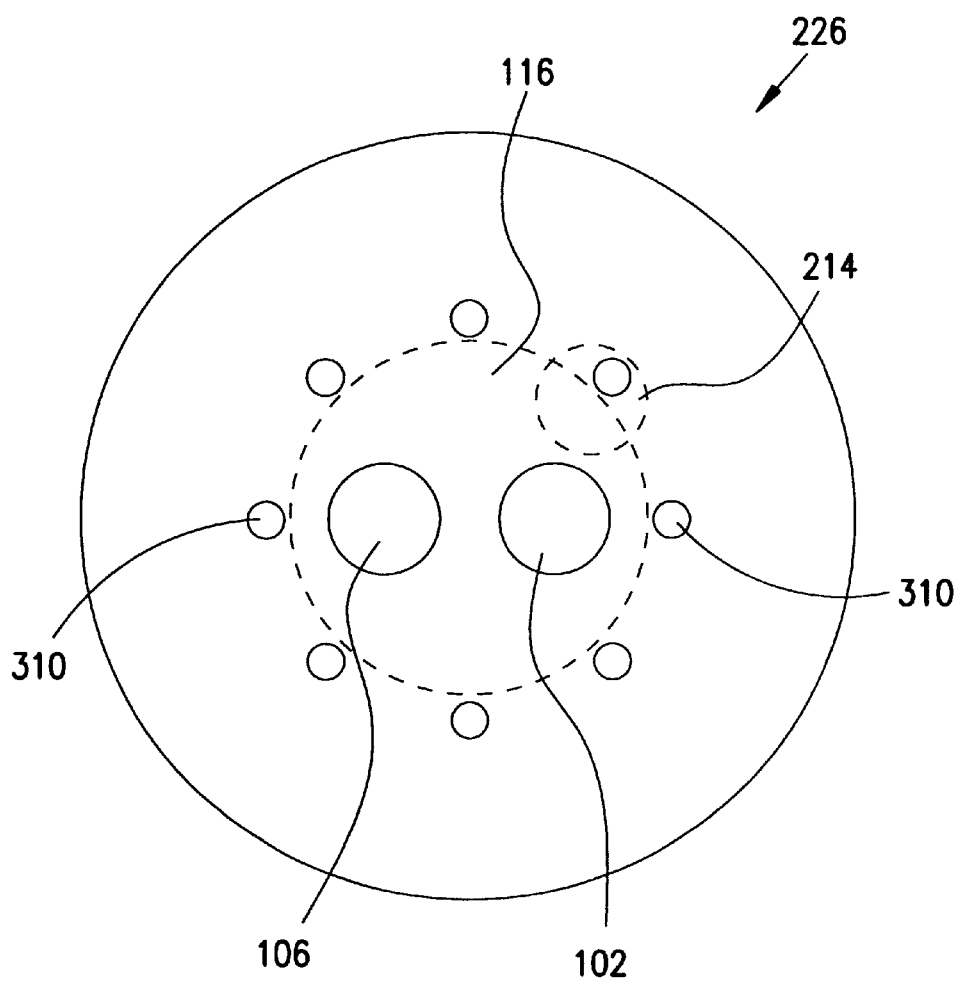
FIG. 3 is an end view of a baffle in the water-heated refrigeration unit shown in FIG. 2 in one embodiment of the present invention.

In the embodiment shown in FIG. 2, there is a baffle 226 that aids in flow distribution of the heated water around the mixer 116 to prevent or minimize plugging of the mixer 116 by the mixer contents. The baffle 226 can be any suitable geometry as long as it aids in flow distribution. As shown in FIG. 3, the baffle 226 contains openings through which heated water flows, thus ensuring that the mixer 116 is being heated uniformly. In the embodiment shown in FIG. 3, the baffle 226 is a circular disk containing eight (8) openings, although the invention is not so limited. Other embodiments do not necessarily contain a baffle as the design and configuration of the heated refrigeration unit may provide adequate flow distribution without a baffle.

Figure 4:
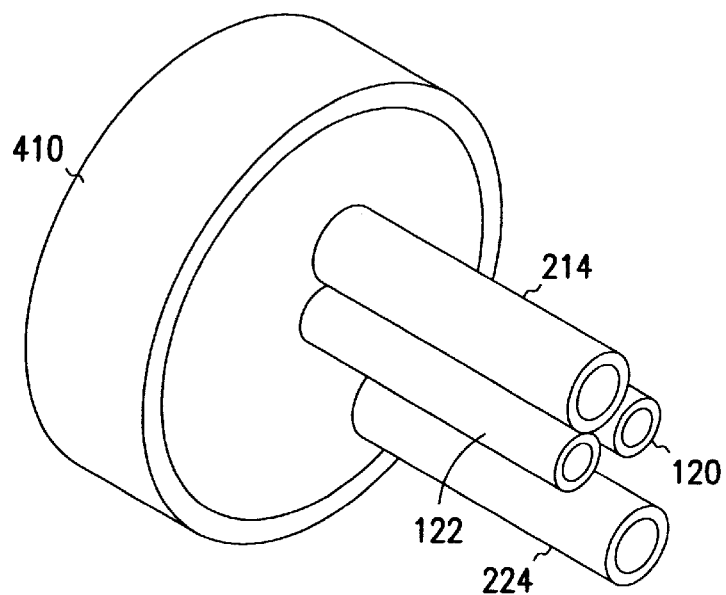
FIG. 4 is a perspective view of an entrance cap for the water-heated refrigeration unit shown in FIG. 2 in one embodiment of the present invention.

FIG. 4 shows an entrance cap 410 for the water-heated refrigeration unit 212 shown in FIG. 2. Although the diameters of the water lines (214 and 224) are shown larger than the premix and refrigerant lines 120 and 122, respectively, in another embodiment, the diameters of the water lines 214 and 224 and the other lines in the system are about the same size. The entrance cap 410 encircles one end of the water-heated refrigeration unit 212. In one embodiment, there is a corresponding exit cap (510) at the opposite end (i.e., exit end) of the mixer. (See FIGS. 5 and 6). In an alternative embodiment, there is no separate entrance cap 410 and the top end of the water-heated refrigeration unit 212 is manufactured with openings for the appropriate lines at the entrance end.

Figure 5:
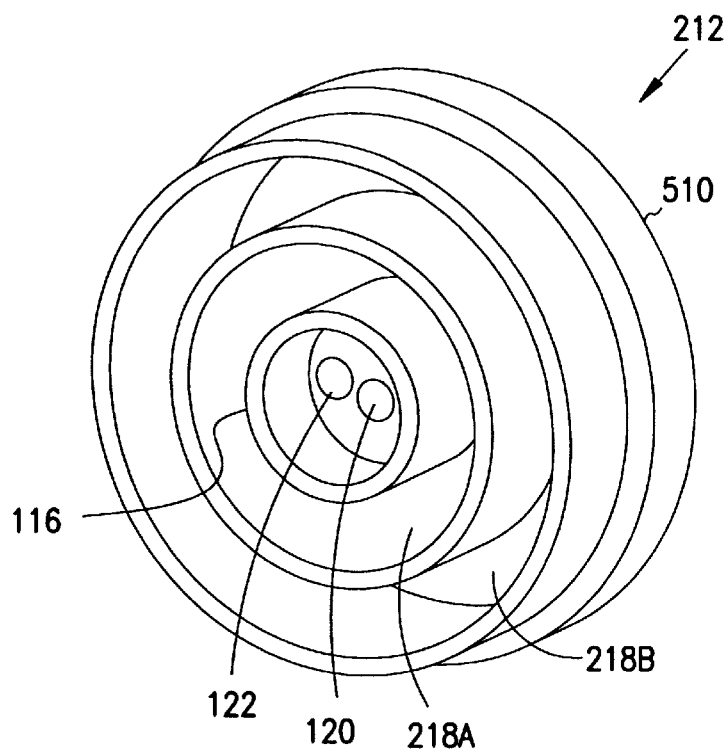
FIG. 5 is a lateral cross-sectional perspective view of an exit end of a heated refrigeration unit in one embodiment of the present invention.

FIG. 5 shows the internal configuration of the exit end of the water-heated refrigeration unit 212 shown in FIG. 2, without the baffle (226). As can be seen, the exit end is surrounded by an exit cap 510. The mixer 116 itself is surrounded in this embodiment by two outer layers, i.e., the inner shell 218A and outer shell 218B, as described above, as well as the exit cap 510.

The exit cap 510 and entrance cap 410 (shown in FIG. 4) can be made from any suitable material and design, as long as a secure fit is provided with the body of any type of heated refrigeration unit, such as the water-heated refrigeration unit 212. In one embodiment, one or both caps (410 and 510) are made from the same material as a heated refrigeration unit. In one embodiment, the entrance and exit caps, 410 and 510, respectively, are screwed onto a heated refrigeration unit with suitably-sized threads located on each of the mating components. In an alternative embodiment, the entrance cap 410 and/or the exit cap 510 is integral with a heated refrigeration unit.

Figure 6:
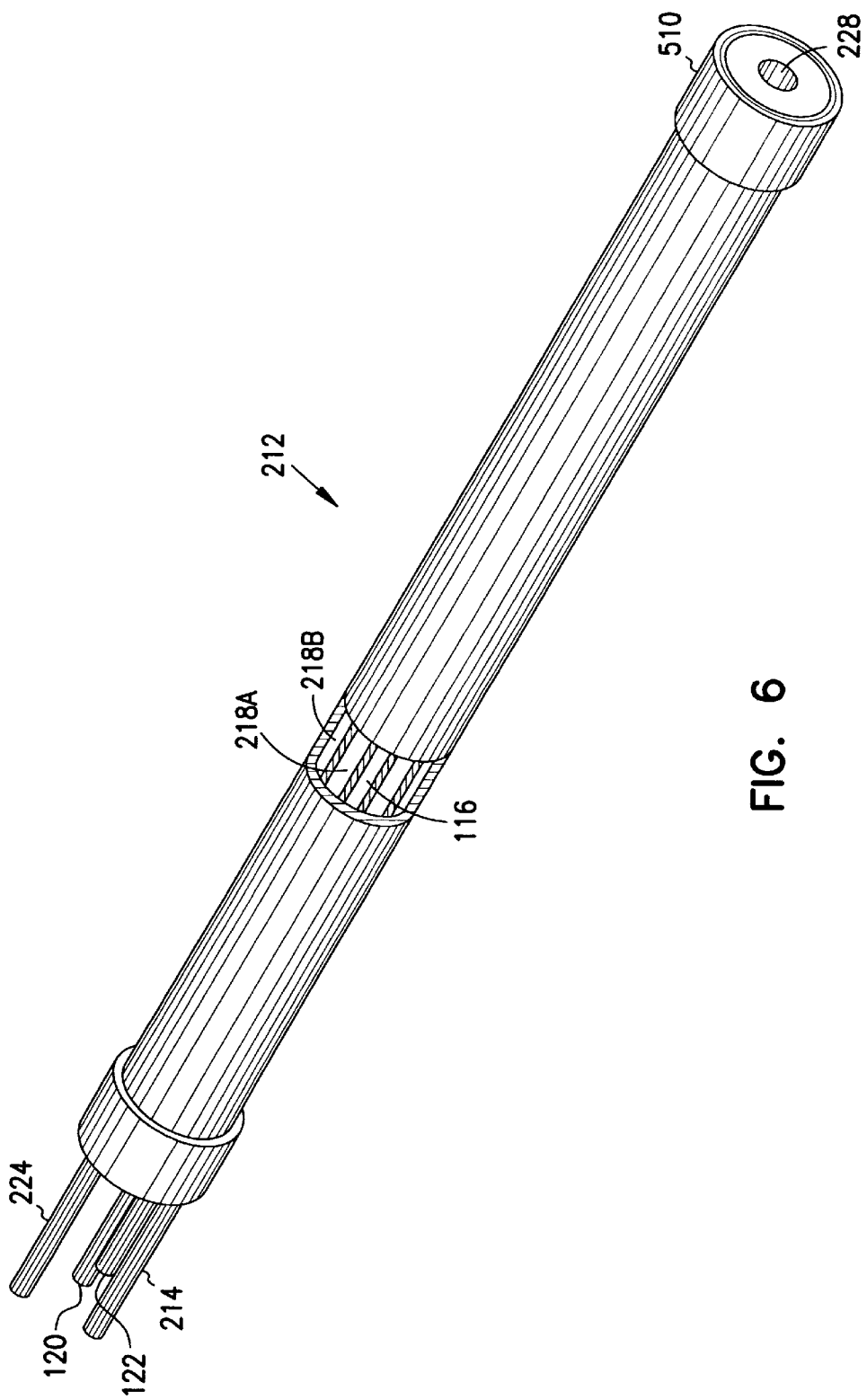
FIG. 6 is a cut-away perspective view of the water-heated refrigeration unit shown in FIG. 2 in one embodiment of the present invention.

In most embodiments, the heated refrigeration unit has the appearance of a long tube. FIG. 6 provides a cut-away perspective view of the water-heated refrigeration unit 212 described in the above figures. As FIG. 6 shows, the water-heated refrigeration unit 212 also has the appearance of a long "tube," with openings on both ends. The external jacket 118 (comprising the inner shell 218A and outer shell 218B) surrounds the internal mixer 116 as shown. The openings in the entrance cap 410 provide access for the incoming premix in line 120, incoming refrigerant in line 122, the incoming heated water in line 214 and the exiting cooled water in line 224. In this embodiment, the exit cap 510 encircles the opposite end of the external jacket 118. Frozen food product and excess refrigerant gas exit out the opening 228 in the mixer 116 at this end.

Figure 7:
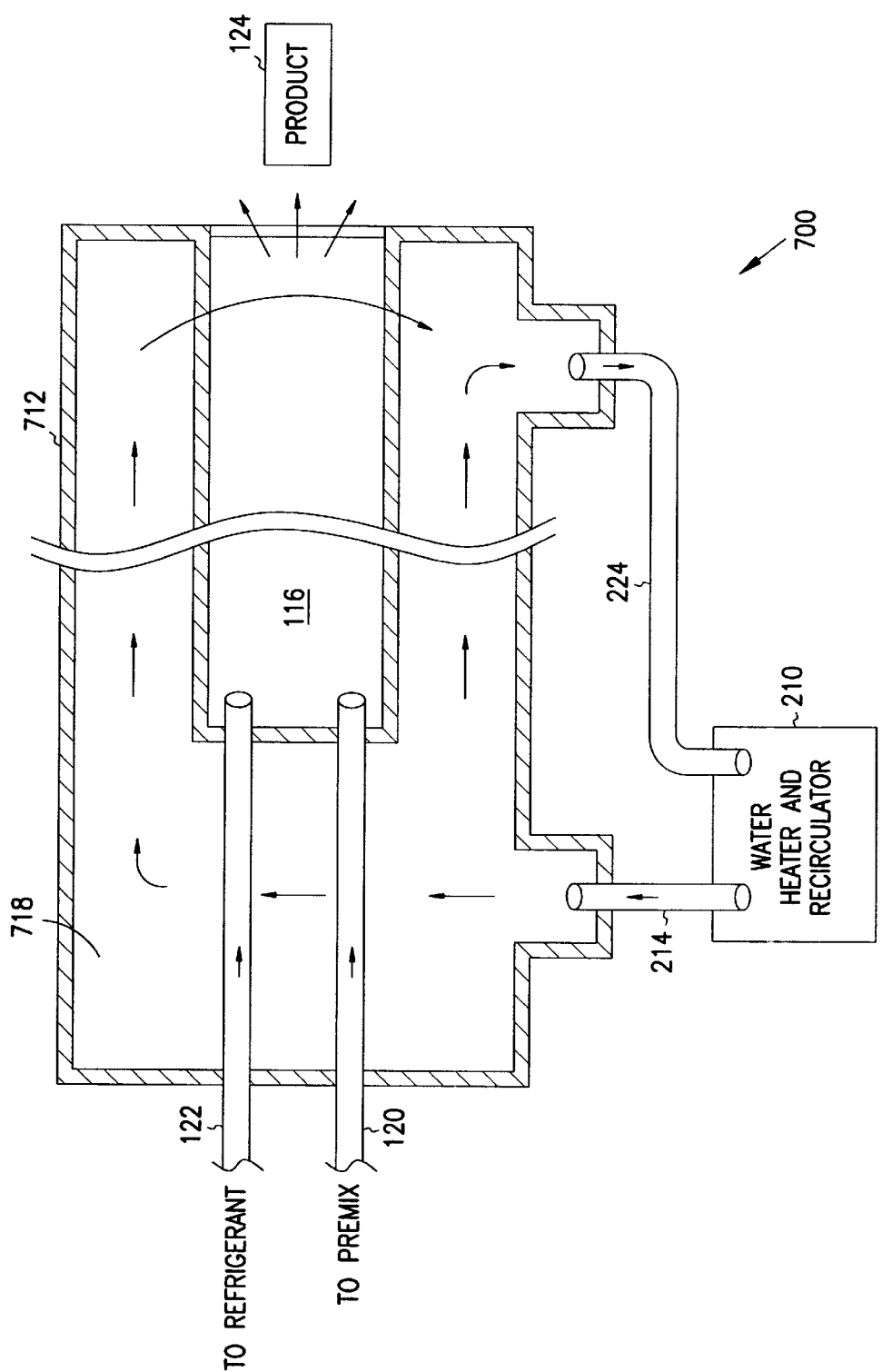
FIG. 7 is a simplified longitudinal cross-section of an alternative water-heated refrigeration unit in one embodiment of the present invention.
Figure 8:
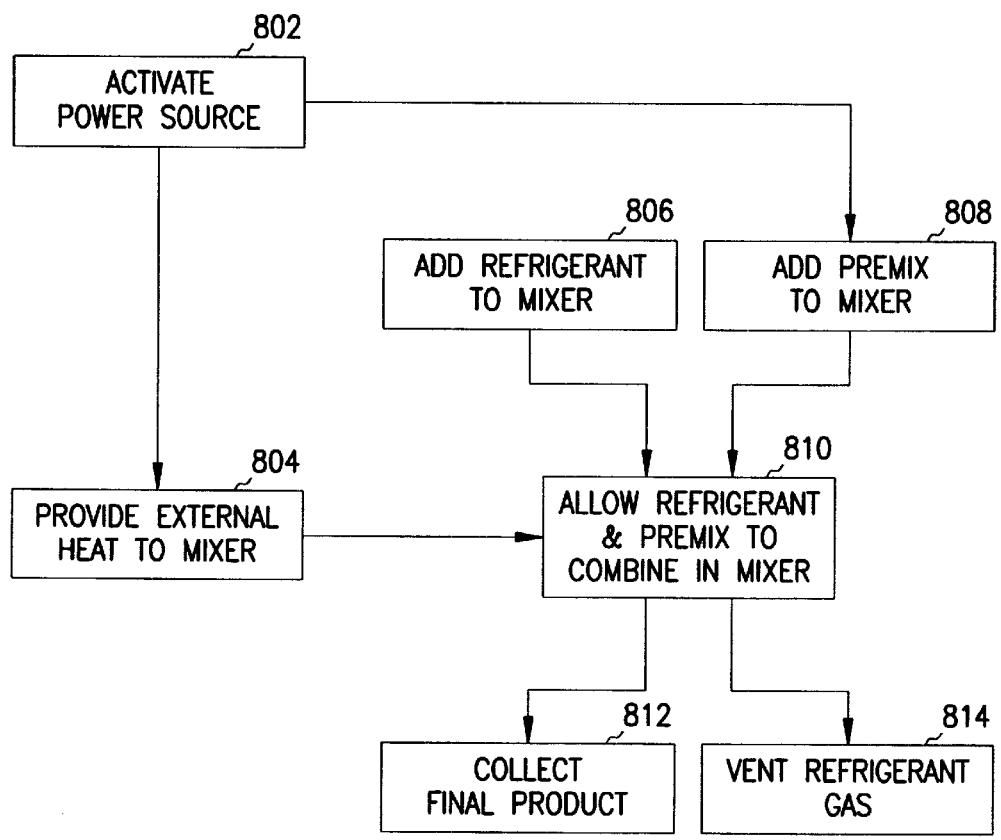
FIG. 8 is a block diagram of a process for producing a frozen food product in one embodiment of the present invention.

In alternative embodiments, heated water and cooled water enter and exit at opposite ends of the system or at various locations along the sides. In the alternative water-heated frozen food product system 700 shown in FIG. 7, heated water enters an alternative water-heated refrigeration unit 712 near the entrance end of the mixer 116. The water exits through line 224 near the exit end of the mixer 116, and returns to the recirculator 210 as before. In this embodiment, there is only one shell 718 through which the water flows, rather than an inner and outer shell as in FIG. 2. In other alternative embodiments, there are more than two shells, such that the heated water makes more than one pass inside a heated refrigeration unit.

In operation, the power source is activated 802 so that the premix pump and heating means can be turned on. The heating means provides 804 external heat to the mixer. In one embodiment, the heating means comprises a fluid heater and recirculator such that the recirculator is also turned on to allow fluid to begin flowing through the external jacket of the heated refrigeration unit, thus providing heat. In one embodiment, the fluid is water that is heated to about 25° C. prior to turning on the recirculator. In another embodiment, steady state may be achieved at a lower temperature, such as about ambient temperature. As a result, the heater may not be necessary, and it may be possible to fill the recirculator using water directly from a tap or a previously-filled bucket, further simplifying the process.

The refrigerant, such as liquid nitrogen, is then added 806 to the mixer by opening a valve in the refrigerant line, causing the refrigerant to begin flowing to the mixer. In one embodiment, the control valve is opened completely to allow the refrigerant to flow at its maximum rate. In one embodiment, the maximum flow rate is about one (1) liter/min. In another embodiment, the control valve is opened only partially, depending on the amount of refrigerant desired in a particular application. Any suitable operating pressure can be used. In one embodiment the operating pressure is between about five (5) and 30 psig (about 0.3 to two (2) atmospheres). In other embodiments it may be possible to operate at pressures greater than approximately 30 psig. In yet another embodiment, suitable flow meters are used to measure refrigerant flow and/or control valves are used to more precisely control the flow of the refrigerant. The refrigerant source can also contain a pressure relief valve as described above. In one embodiment, the refrigerant is liquid nitrogen that enters the mixer and contacts the premix at a temperature of about −196° C. In one embodiment, the product exiting the mixer is at a temperature of between about −40° C. and 10° C. The temperature of the exiting product is dependent on the thermal equilibrium reached between the resulting refrigerant gas and premix at the exit opening of the mixer.

Unlike other known systems, use of excess refrigerant in the present invention does not have an adverse effect on the final product. As a result, it is possible to use varying levels of refrigerant and premix, depending on the particular application. In one embodiment, the ratio of refrigerant to premix is about 1:1. In another embodiment, the ratio is greater than 1:1, up to 2:1 or more refrigerant used as compared to premix. Obviously the use of excess refrigerant can add to the operation costs, but in some instances may be the easiest and most convenient way to operate the unit in order to assure a satisfactory final product. Any excess gas is easily vented as it leaves the mixer, either directly into the atmosphere, or through vent holes, such as the vents 126 in the lid 124 shown in FIG. 1.

In most instances, some refrigerant gas is present in the final product. As noted above, this increased volume is known as "overrun." In one embodiment, the final product has an overrun of between about 30 and 70 percent. In another embodiment, the final product has an overrun of about 50 percent. This means that the volume of the final product is about 50% larger than the starting volume, due to the added refrigerant. The actual amount of overrun is dependent on the particular application, but may possibly be controlled, in part, by causing one or both of the incoming fluids (i.e., premix and refrigerant) to become highly dispersed, although dispersion of the premix may cause air to be added to the final product. In one embodiment, a spray nozzle is used to increase dispersion. It is also possible that the amount of overrun can be affected by adjusting flow rates, although this has not been tested. In embodiments in which there is no added air (such as when pure liquid nitrogen is used rather than a liquid nitrogen/air combination, for example), the product of the present invention is less susceptible to oxidation over time. Oxygen in the final product causes the product to oxidize, resulting in degradation of the organoleptic properties of the stored ice cream.

The premix pump is then turned on, causing premix to be added 808 to the mixer via the premix line. The premix can flow at any suitable rate. In one embodiment, the premix flows at about 50% to 100% of the rate of the refrigerant. In a particular embodiment, the refrigerant is liquid nitrogen and both the liquid nitrogen and premix are flowing at about one (1) liter per minute producing a product resembling conventional "soft serve" ice cream. In another embodiment, the liquid nitrogen is flowing at about one (1) liter per minute, with the premix flowing at about 0.7 liters per minute, producing a product resembling conventional "hard" ice cream. If the premix is not in liquid form, it can be liquefied prior to entering the mixer. The premix can have a range of viscosities and can also contain various additives. Generally, as long as the premix can be delivered to the mixer, either via pump, under pressure, or by any other suitable means, it can be used in the various embodiments of the present invention. In one embodiment, water is used as the premix, such that the frozen food product is a "slushy" product. In this embodiment, the water can be combined with various flavorings, if desired. In another embodiment, the premix has the viscosity of a heavy cream. In yet another embodiment, the premix has an even higher viscosity, such as honey or molasses.

The premix and refrigerant are allowed to combine naturally 810 to form a frozen food product that is collected 812 from the other end of the mixer as described herein. At some point in the mixer the premix and refrigerant have mixed sufficiently and intimately enough to produce a consistent frozen end product as defined above. In one embodiment, a consistent end product is produced in approximately the final one-third portion of the mixer, although further testing can determine this with greater accuracy. Excess refrigerant gas also exits the end of the mixer and is vented 814 through holes in the lid of the collection container. Again, it is the external heating of the mixer as described herein that prevents the mixer 116 from plugging and aids in removal of the frozen food product. Since the resulting product is sufficiently warm for immediate consumption, there is no need to further heat the end product once it has exited the mixer. The final product can then be stored 814 in a conventional manner to maintain the desired temperature and viscosity. For example, a soft-serve type of product may be stored at slightly higher temperatures than hard ice cream. In some embodiments, the end product can be described as a "creamy solid," similar to conventional hard-serve ice cream. Again, in embodiments where cryogenic refrigerants that do not contain oxygen (e.g., liquid nitrogen) have been used, no added oxygen is present in the final product, having the advantages noted above.

The final product can contain any number of additives, coloring agents, flavorings, and so forth, as defined above. These additives can be added at any time during the process, depending on the type and size of operation, the type of additive, the type of premix, the desired final product, and so forth. In one embodiment, the heated refrigeration unit is adapted to receive additives directly into the mixer. Some additives, however, such as calcium, may require more time to disperse, and may need to be added earlier in the process. Alternatively, components can be fractionated, or more soluble forms of components, such as calcium, can be used. Various toppings can also be added to the final product. If the unit is a portable unit capable of providing a final product in bulk that can be served individually, the customer can immediately customize his or her end product as desired with a selection of toppings. In another embodiment, a multi-serving container of final product is purchased by the consumer for consumption at another location.

Although those skilled in the art would recognize that turbulent flow is occurring at the moment the liquid refrigerant contacts the premix, due primarily to vaporization of the liquid refrigerant, specific fluid dynamic measurements and calculations have not been performed for the various embodiments of the frozen food product system. These include determining an overall energy balance for each embodiment, measuring flow rates, determining velocity distribution and drag, entrance effects, heat transfer effects, temperatures and pressure of the various components at various stages, and so forth. The precise values of various aspects of this system can be determined, however, by using appropriate measuring devices known in the art, making sequential runs while altering certain variables, and/or performing the appropriate mathematical calculations via computer or otherwise, such as those described in Bennett & Myers, *Momentum, Heat and Mass Transfer*, second edition, McGraw-Hill Book Company, 1974 and Bird, Stewart and Lightfoot, *Transport Phenomena*, John Wiley & Sons, Inc., 1960, both of which are hereby incorporated by reference in their entirety.

By making the appropriate measurements and calculations, the system can be optimized. Such information may be particularly useful for large-scale operations. However, the system, as currently designed is able to quickly, consistently and continuously produce a food product for the consumer that is either frozen, partially frozen or chilled, depending on the particular product desired. Furthermore, the overall energy balance of the system can be controlled in many ways during operation. For example, by increasing the speed in which the heat transfer fluid recirculates or increasing the temperature of the heat transfer fluid, either more refrigerant or less premix is required to obtain a product having the same hardness or softness level. Essentially, such changes cause the rate of heat transfer from the jacket to be increased or decreased.

Additionally, it is also known that the more refrigerant that is vaporized upon contact with the premix, the more turbulent the flow will become within the mixer, i.e., the velocity in the mixer will increase due to the vaporization of the refrigerant. This, in turn, allows for more "intimate" mixing of the components, as described above. In one embodiment, more than 90% of the refrigerant is vaporized. In another embodiment, more than 50% of the refrigerant is vaporized. In a specific embodiment, liquid nitrogen is used as the refrigerant, with over 99% of the liquid nitrogen vaporizing in the mixer. Again, increased vaporization is likely more dependent on increased contact time (e.g., longer mixer) rather other variables within the system, such as flow rates, temperatures, and so forth, although further testing will determine the effects of other variables with more certainty.

The apparatus and method of the invention can be implemented using a variety of specific equipment available to and understood by those skilled in process control art. For example, means for sensing temperature, pressure and fluid flow rates in all of the fluid flow lines may be accomplished by any suitable means. It will also be appreciated by those skilled in the art that the invention can include a system controller. Such a feature may be particularly desirable in large-volume operations where product is being produced on a continuous basis, although the invention is not so limited.

Specifically, the system controller can be coupled to various sensing devices to monitor certain variables or physical phenomena, process the variables, and output control signals to control devices to take necessary actions when the variable levels exceed or drop below selected or predetermined values. Such amounts are dependent on other variables, and may be varied as desired by using the input device of the controller. Such sensing devices may include, but are not limited to, devices for sensing temperatures, pressures and fluid flow rates, and transducing the same into proportional electrical signals for transmission to readout or control devices may be provided for in all of the principal fluid flow lines. Such a controller may be a local or remote receiver only, or a computer, such as a lap top or personal computer as is well-known in the art. In one embodiment, the controller is a personal computer having all necessary components for processing input signals and generating appropriate output signals as is understood in the art. These components can include a processor, a utility, a driver, an event queue, an application, and so forth, although the invention is not so limited. In one embodiment, the controller has a non-volatile memory comprised of a disk drive or read only memory device that stores a program to implement the above control and store appropriate values for comparison with the process variables as is well known in the art.

In one embodiment, these components are all computer programs executed by a processor of the computer, which operates under the control of computer instructions, typically stored in a computer-readable medium such as a memory. In this way, useful operations on data and other input signals can be provided by the computer's processor. The controller also desirably includes an operating system for running the computer programs, as can be appreciated by those within the art.

The system controller may also comprise a machine coupled to a control panel. Buttons and dials can be provided on the control panel to allow modification of the values and to control of the frozen food processing system to take desired steps such as filling and heating water in the water heater, recirculating water, flowing refrigerant through the mixer, flowing premix through, the mixer, processing and packaging the final product, and so forth. The system controller can also be programmed to ignore data from the various sensors when the operator activates certain other buttons and dials on the control panel as he deems necessary, such as fill override or emergency stop buttons. Alternatively, or in addition to the foregoing, the control panel can include indicator lights or digital displays to signal an operator as to the status of the operation. Indicator lights can also be used to signal that a certain variable level is outside the desired range, therefore alerting the operator to the need for corrective action. In such an embodiment, the corrective action is not automatic, but requires the operator to initiate corrective action either by pushing a specific button or turning a specific dial on the control panel, or by manually adjusting the appropriate valve or device.

The invention will be further described by reference to the following example which is offered to further illustrate another embodiment of the present invention. It should be understood, however, that many variations and modifications may be made while remaining within the scope of the present invention.

EXAMPLE

Vanilla ice cream was produced during this experiment using a water-heated refrigeration system similar to the system shown in FIG. 2. Tap water was used to fill a 3.8 liter (one (1) gallon) tank in a Fisher Science Model 800 Isotemp Constant Temperature Circulator "recirculator") made by Fisher Scientific Company in Pittsburgh, Pa. The recirculator was placed on a table approximately 0.75 m (about 2.5 fit) off the ground for ease of operation, although this is not necessary for operation of the system. One end of a braided Norton Norprene™ tubing made by Norton Performance Plastics Corp. in Akron, Ohio, that was about 2.3 m (about 7.5 ft) in length had previously been passed through an opening in one end of the heated refrigeration unit and into an opening in the inner shell of the heated refrigeration unit (i.e., heated water line 214). The tubing had an inner diameter of about 95 cm (about 0.375 in) and an outer diameter of about 1.27 cm (0.5 in). The openings in the heated refrigeration unit were about the same as the inner diameter of the tubing to ensure a tight fit. The other end of the tubing was then connected to an exiting nozzle in the recirculator, i.e., 0.95 cm nipple, and was secured in place with hose clamps. One end of a second tube of the same dimensions had previously been passed through a second opening in the same end of the heated refrigeration unit to just inside the outer shell of the heated refrigeration unit (i.e., cooled water line 224). Again, this opening was about the same diameter as the tubing to ensure a tight fit. The other end was connected to an entering nozzle on the recirculator in a similar manner. Cool water returning from the heated refrigeration unit flowed through this tubing to be reheated and recirculated.

Two 1.9 liter (one-half gallon) containers of Sara Ann™ brand ice cream premix made by Anderson Erikson (AE) Farms in Des Moines, Iowa, were used as the premix. The premix was at a temperature of about 15° C. (59° F.). One end of an approximately 1.8 m (about six (6) ft) length of the same type of neoprene food tubing was placed in the container, which was placed on the floor (i.e., premix line 120). The tubing passed through a Masterflex 7518 peristaltic pump made by Cole-Parmer Instrument Co. in Vernon Hills, Ill. The pump was placed on the table next to the recirculator. Although the premix container was placed on the floor, this was not necessary for operation, and in most instances, would be a less preferable configuration when the premix pump is elevated as it was here. However, since the flow rate of the premix was controlled by the pump speed, the flow rate was independent of pressure, and the relative positions of the pump and premix did not appear to have an impact on the operation. The opposite end of the tubing had previously been connected to a mixer opening located at the same end of the heated refrigeration unit as the tubings from the water source were placed. This opening extended through the outer shell and inner shell and into an opening in a first end of the mixer.

A Tech 35 liquid nitrogen tank made by Cryogenic Services, Inc. in Canton, Ga. was also placed nearby on the floor. This is a vacuum-sealed container holding about 30 liters of liquid nitrogen. One end of a 1.27 cm (0.5 in) diameter flexible stainless steel tube about 1.8 m (about six (6) ft) in length was connected to a second opening in the same end of the mixer as the food tubing for the premix (i.e., refrigerant line 122). The other end was connected to the feed valve on the liquid nitrogen tank. Most of the length of the copper tube was insulated with Rubatex Insul-tube™, a poly isobutylene insulation material. This insulation material had an inner diameter of about 2.86 cm (1.125 in) and a wall about 1.27 cm (about 0.5 in). The insulation wrapped around the tube and was secured in place by removing the covering for an adhesive strip and pressing the insulation in place.

Both the recirculator and peristaltic pump were then connected to a conventional power grid. The heater was then turned on for about five (5) minutes to allow the water in the recirculator to heat to about 21° C. (The sequence of the various steps described above could be changed in any manner desired, such that the power supply could be connected first so that the water could be heating while the connections to the liquid nitrogen, starter and recirculator are being made).

The recirculator itself was activated, allowing water to begin flowing into the heated refrigeration unit through the heated water line. The valve on the liquid nitrogen tank was then opened completely, allowing the refrigerant to flow into the mixer at about one (1) liter per minute. A pressure gauge on the liquid nitrogen tank indicated that the operating pressure was about 20 psig. After about 30 to 60 seconds, when vapor was exiting the nitrogen tank, liquid nitrogen was heard flowing in the tube. The peristaltic pump was then turned on, drawing ice cream premix into the mixer at a rate of about 70% of the maximum possible rate, corresponding with about 0.7 liters per minute. It is important to start the premix pump after the liquid nitrogen is flowing into the mixer to avoid starter from running through the mixer either unmodified or slightly warmed. Almost immediately, product could be heard exiting from the mixer into the frozen food product container. The sound was indicative of a product exiting under pressure. At about the same time, clouds of cooled nitrogen vapor was observed exiting from the vents in the lid of the container.

The process was continued for about three minutes and 39 seconds, after which time, about 3.8 liters (about one (1) gallon) of premix had been used. This resulted in about 4.75 liters (about 1.25 gallons) of final product, such that there was an overrun of about 25%. The final product had a creamy and smooth texture, similar to a soft serve dairy product, although it was firmer than soft serve ice cream. The temperature of the final product was initially at about −20° C., although this temperature increased slowly over time as the container was not insulated and was also exposed to ambient air temperatures. The product was storable for an extended period of time in a conventional freezer or a deep freeze.

Conclusion

Unlike conventional frozen food processing systems, the present invention actually warms the inner surface of the wall of the mixer sufficiently to aid in removal of the final product from the mixer. Additionally, the turbulence created naturally by the rapid vaporization of the cryogenic refrigerant provides sufficient mixing without the need for added mechanical mixing means. The resulting products have appealing textures and tastes. The unit is designed to be operated in a continuous manner (including continuous short runs) to produce a desired final product, although it can also be set up as a batch operation, if desired. Depending on its overall size, the unit can be used in a portable manner or as a large-scale commercial device. In one embodiment, the system is small enough to be used in a variety of small-scale operations, including, but not limited to any place where people gather, such as airports, railroad stations, shopping malls, stadiums, theaters, outdoor events or locations, including parades, festivals, parks (e.g., ball parks, theme parks), and so forth.

In the claims:

1. An apparatus for making a frozen food product comprising:
    a mixer having an inner wall surface, the mixer adapted to accept a premix and refrigerant, the premix and refrigerant combining inside the mixer to produce a frozen food product, wherein the mixer contains no moving parts; and
    heating means external to the mixer for heating the inner wall surface.

2. The apparatus of claim 1 wherein the frozen food product is a liquid at the inner wall surface.

3. The apparatus of claim 2 wherein the heating means is a heat exchanger.

4. The apparatus of claim 3 further comprising:
    a fluid recirculator connected to the heat exchanger;

a pump connected to a premix source, wherein premix is pumped into the mixer; and a container for collecting the frozen food product.

5. The apparatus of claim 4 wherein the fluid recirculator is a water recirculator.

6. The apparatus of claim 4 wherein the container has a lid, further wherein the lid has refrigerant vents.

7. The apparatus of claim 4 wherein the container is pressurized.

8. The apparatus of claim 6 wherein the refrigerant is selected from the group consisting of carbon dioxide, liquid nitrogen, liquid air, liquid argon, liquid helium, liquid oxygen, or any combination thereof.

9. The apparatus of claim 8 wherein the refrigerant and premix are combined in a ratio of at least about 1:1.

10. The apparatus of claim 9 wherein the refrigerant is flowing at a predetermined flow rate, further wherein the premix is flowing at a rate of between about 70% and 100% of the predetermined flow rate.

11. A method for making a frozen food product comprising:

providing a mixer having a heated inner wall surface; and allowing a refrigerant and a premix to combine naturally inside the mixer to produce a frozen food product, wherein the mixer contains no moving parts.

12. The method of claim 11 wherein the frozen food product is a liquid at the heated inner wall surface.

13. The method of claim 11 wherein the mixer is heated externally.

14. The method of claim 13 wherein the mixer is heated externally with a heat transfer fluid.

15. The method of claim 14 wherein the heat transfer fluid is water.

16. The method of claim 14 wherein the refrigerant is selected from the group consisting of carbon dioxide, liquid nitrogen, liquid air, liquid argon, liquid helium, liquid oxygen and any combination thereof.

17. The method of claim 16 wherein the premix and refrigerant are in thermal equilibrium.

18. The method of claim 17 wherein the refrigerant is flowing at a predetermined flow rate, further wherein a premix flow rate is between about 70% and 100% of the predetermined flow rate.

19. The method of claim 18 wherein a soft or hard frozen food product is obtained, depending on the premix flow rate.

20. A frozen food product system comprising:

a mixer having an inner wall surface, the mixer adapted to accept a premix and liquid nitrogen, the premix and liquid nitrogen combining inside the mixer to produce a frozen food product, wherein the mixer contains no moving parts;

a heat exchanger external to the mixer for heating the inner wall surface;

a water recirculator connected to the heat exchanger;

a pump connected to a premix source, wherein premix is pumped into the mixer; and a container for collecting the frozen food product, wherein the container has a lid with vents.

21. The system of claim 20 wherein the frozen food product is ice cream, sorbet or yogurt at a temperature of between about −40° C. and 10° C.

* * * * *

UNITED STATES PATENT AND TRADEMARK OFFICE
CERTIFICATE OF CORRECTION

PATENT NO. : 6,510,890 B1
DATED : January 28, 2003
INVENTOR(S) : Paskach et al.

It is certified that error appears in the above-identified patent and that said Letters Patent is hereby corrected as shown below:

Title page,
Item [73], Assignee, delete "ID" and insert -- IA --, therefor.

Column 1,
Line 36, delete "to," and insert -- to --, therefor.

Column 5,
Line 25, delete "in)." and insert -- in) --, therefor.

Column 6,
Line 1, before "diameter" insert -- in --.
Line 52, before "recirculator")" insert -- ( --.

Column 12,
Line 61, delete "fit)" and insert -- ft) --, therefor.

Column 13,
Line 53, after "insulation" insert -- was --.

Signed and Sealed this

Twenty-third Day of September, 2003

JAMES E. ROGAN
*Director of the United States Patent and Trademark Office*